Sept. 3, 1963
B. J. LINDAL
3,102,714
VEHICLE LIFT
Filed Sept. 26, 1960
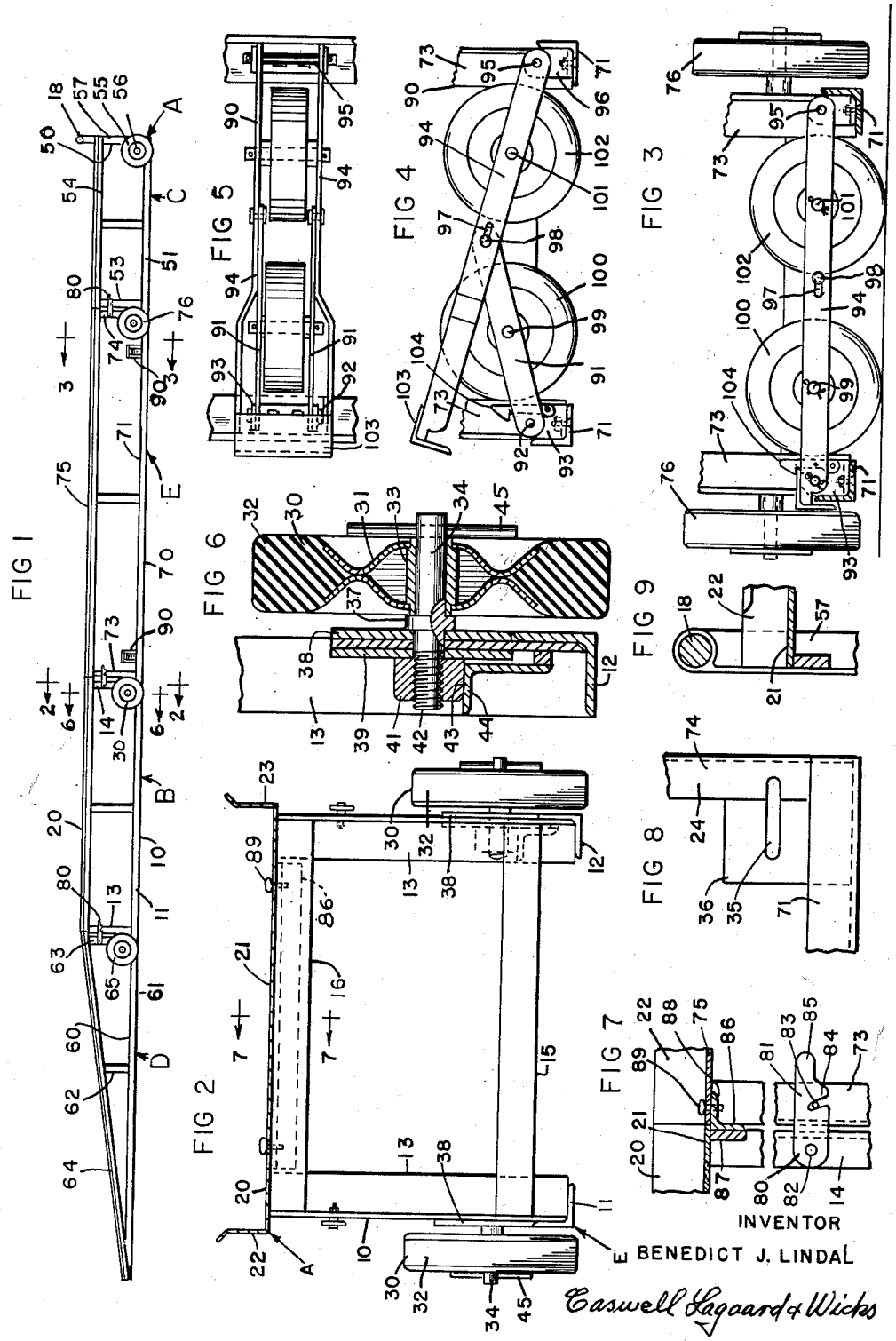
INVENTOR
BENEDICT J. LINDAL
Caswell Lagaard & Wicks
ATTORNEYS

United States Patent Office 3,102,714
Patented Sept. 3, 1963

3,102,714
VEHICLE LIFT
Benedict J. Lindal, 2547 10th Ave. S.,
Minneapolis 4, Minn.
Filed Sept. 26, 1960, Ser. No. 58,523
4 Claims. (Cl. 254—88)

The herein disclosed invention relates to vehicle lifts and has for an object to provide a lift by means of which the vehicle may be elevated above the ground through its own power and thus supported while being worked upon from beneath.

Another object of the invention resides in providing a lift in which greater access is given to the under structure of the vehicle than is possible with similar lifts.

A still further object of the invention resides in constructing the lift with two wheel-supporting sections on which the wheels of the vehicle rest, a ramp connected to one of said sections and an intermediate section disposed between the said wheel supporting sections, all of said sections being detachably connected together.

An object of the invention resides in making the intermediate section removable so that greater access may be had to the under structure of the vehicle while the same rests on the wheel-supporting sections.

Another object of the invention resides in providing guide means preferably in the form of wheels for guiding the intermediate section for transversing movement relative to the lift.

Another object of the invention resides in arranging said wheels with their axes extending longitudinally and parallel to the ground.

A feature of the invention resides in providing means for raising and lowering said wheels to cause the same to engage the ground and elevate the section to allow of rolling the section away from the remaining sections.

A feature of the invention resides in providing toggle arms to which the wheels are pivoted for raising and lowering the wheels.

Other objects of the invention reside in the novel combination and arrangement of parts and in the details of construction hereinafter illustrated and/or described.

In the drawings:

FIGURE 1 is an elevational view of a vehicle lift illustrating an embodiment of the invention.

FIGURE 2 is a cross sectional view taken on line 2—2 of FIGURE 1 and drawn to a greater scale.

FIGURE 3 is a view similar to FIGURE 2 and taken on line 3—3 of FIGURE 1 and showing the section elevated.

FIGURE 4 is a view similar to FIGURE 2 and illustrating the parts in normal position.

FIGURE 5 is a plan view of the structure shown in FIGURE 3.

FIGURE 6 is an elevational sectional view taken on line 6—6 of FIGURE 1 and drawn to a greater scale.

FIGURE 7 is an elevational sectional detail view taken on line 7—7 of FIGURE 2.

FIGURE 8 is a fragmentary elevational view of a corner of the intermediate section and with the longitudinally running wheel removed therefrom.

FIGURE 9 is a detail view illustrating the bumper of the invention.

The vehicle lift illustrated comprises two runways, one for the pair of wheels on each side of the vehicle. These runways being identical in construction, only one has been illustrated and will be described.

The runway illustrated is indicated by the reference character A and comprises two wheel-supporting sections B and C, a ramp section D and an intermediate section E. These sections are constructed in the following manner:

The section B is disposed at the rear of the lift and comprises a frame 10. This frame consists of longitudinal frame members 11 and 12 and on which are mounted posts 13 and 14. Extending across the posts 13 are cross frame members 15 and 16, which form a rigid frame construction. A track 20 overlies the cross frame members 16 and is secured thereto. This track is constructed from sheet metal and has a tread 21 formed with flanges 22 and 23 extending upwardly therefrom. The tread 21 is wider than the frame 10 and is secured thereto by means of welds or bolts not shown. The wheels of the vehicle ride on the treads 21 and the flanges 22 and 23 prevent the wheels from running off the treads.

The section B is supported on two supporting wheels 30, as shown in FIGURE 6. Each is constructed with a wheel center 31 supporting a rubber tire 32. Mounted in the wheel center 31 is a bushing 33 which is rotatably mounted on a stub shaft 34. Stub shaft 34 extends through a slot 35 formed in a filler piece 36, welded to the post 14, and to the longitudinal frame member 12. A slot 35 extends through said piece and into the outer flange 24 of the post 14. The stub shaft 34 is formed with a collar 37 which butts up against a clamping plate 38 and which overlies the filler piece 36 and flange 24 on the outer side thereof. The stub shaft 34 extends through another plate 39 similar to the plate 38 and which overlies the filler piece 36 and flange 24 upon the inner surface thereof. The shaft 34 has a threaded inner end 42 which screws into a nut 41 fast on the plate 39. This nut has a flat 43 on the underside thereof and which rides along a rail 44 secured to the longitudinal frame member 12. This keeps the nut from rotating. The rail 44 is positioned parallel to the slot 35. The end of the stub shaft 34 has a cross pin 45 extending through the same and which serves as a handle for rotating the shaft 34, and which, in addition, holds the wheel 30 in position. By means of this construction, the threaded end 42 of shaft 34 can be screwed into the nut 41 and the two plates 38 and 39 drawn against the filler piece 36 to clamp the shaft 34 in any adjusted position in slot 35.

The wheel-supporting section C is similar to the section B and is constructed to provide a frame 50. This frame has lower longitudinal frame members 51 and posts 53 and 57 extending upwardly therefrom. A track 54 similar to the track 20 is secured to the frame 50 in the same manner as the track 20. The frame 50 is also supported at one end by means of wheels 55 which are rotatably mounted on a shaft 56 secured to the posts 57.

The ramp section D of the invention consists of a frame 60 which is constructed with two lower longitudinal frame members 61 and with posts 62 and 63 extending upwardly therefrom. Across these posts are provided transverse frame members not shown and which support a track 64 in inclined relation with respect to the frame members 61. The track 64 is similar to the track 20 and the parts are secured together in the same manner. The rear end of the frame 60 is supported on wheels 65 which are mounted in the same manner as the wheels 55.

Disposed in between the sections B and C is the intermediate section E, which is constructed in the same manner as the sections B and C. This section comprises a frame 70, provided with lower longitudinal frame members 71 and on which are mounted posts 73 and 74. A track 75 overlies the posts 73 and 74 and is secured thereto in the same manner as the track 20 on suitable cross frame members not shown. The rear end of the frame 70 is supported on wheels 76, which are adjustable and removably attachable to said frames by construction identical to that used for supporting the wheels 30.

The various sections are connected together by means of latching means 80 consisting of hooks 81 best shown in FIGURE 7. These hooks are pivoted by means of pintals 82 to the posts 63, 14 and 74 and engage pins 83 extending outwardly from the posts 13, 73 and 53. These pins slide in slots 84 which spiral inwardly so as to draw the posts together when the hooks are moved downwardly. Finger pieces 85 on the ends of said hooks 81 facilitate engagement and disengagement of the hooks with the pins 83.

To hold the tracks 20, 54, 64 and 75 together, a construction is employed which is identical for each section. For this reason, the construction used in conjunction with sections B and E will be described in detail and which is also shown in FIGURE 7. This construction utilizes a clip angle 86 which is attached to a cross bar 87 welded to the top of the posts 14. This angle has a flange 88, which underlies the track 75. A headed pin 89 extends through the track 75 and the flange 88 and locks the parts in position.

The intermediate section E is supported by two tracks. These tracks being identical, only the track at the front of the section will be described. This track consists of spaced arms 91, which are pivoted by means of a pintle 92 to a U-shaped support 93 bolted to the longitudinal frame member 71. In addition, two other spaced arms 94 are employed which are pivoted by means of a pintle 95 to a U-shaped support 96, secured to the other longitudinal frame member 71. The arms 94 have slots 97 in them and in which are slidably mounted rivets 98 secured to the inner ends of the arms 91. This permits the arms to swing from the positions shown in FIGURE 3 to those shown in FIGURE 4 and vice versa. Disposed between the arms 91 and pivoted thereto on an axle 99 secured to said arms, is a supporting wheel 100. Similarly disposed between the arms 94 and pivoted on an axle 101 secured to said arms is a supporting wheel 102. These wheels, when in the position shown in FIGURE 4, are raised above the floor and are free to move over the floor in the direction of the axes of the axles 99 and 101; and when moved to the position shown in FIGURE 3, engage the floor and can move in a direction normal to said axes, the frame 70 being elevated above the ground.

The ends of the arms 94 have attached to them a foot piece 103, which is in the form of an angle and which serves as an actuating means for moving said arms. A hook 104 pivoted to support 93 and urged toward the left, as shown in FIGURE 3, by means of a spring not shown, is adapted to engage said foot piece and to hold the bars 94 in the position shown in FIGURE 3 and with the frame 70 and the wheels 76 elevated, in a position to be engaged by the foot piece 103 so that when the said foot piece is moved onwardly, the same becomes automatically latched by the hook.

The posts 57 at the end of the wheel-supporting section C extend above the track 75 and have a cross bar 18 secured thereto and which limits the movement of the vehicle wheel along said track.

The method of using the invention is as follows:

Due to the position of the wheels 55, 76 and 65, when located in the position shown in FIGURE 1, the individual sections when detached may be elevated at their outer ends and wheeled about, as in the use of a wheel barrow. The sections are, when the lift is desired for use, successfully arranged in alignment and the latch members 80 moved into latching position, as shown in FIGURES 1 and 7. The intermediate sections are then further connected together by means of the pins 89. After the sections have been properly connected together, the vehicle, through its own power, is driven up the ramp section D and along the sections B, E and C. When properly positioned, the rear wheels of the vehicle rest upon section B and the front wheels upon section C. Section E may now be removed by disengaging the latch members or hooks 80 and the pins 89. Wheels 30 and 76 are next shifted rearwardly of the section by unloosening the stub shafts 34 through cross pins 45 and sliding the said wheels and stub shafts along the slots 35. When at the rearward ends of the slots the wheels 30 and 76 are inwardly of the forward ends of the sections B and C and the section E may move laterally relative to the other sections. As soon as the said section is free, the two tracks 90 are brought into action by stepping on the foot pieces 103 of the same and latching them in the positions shown in FIGURE 3. This raises the section E above the ground, and the said section is solely supported on the wheels 100 and 102. The intermediate section now may be removed laterally from in under the vehicle to give free access to the under structure of the vehicle from the center of the same. If desired, the ramp section may also be removed to give access to the vehicle from the rear thereof.

While only two wheel-supporting sections have been shown in the drawings, other pairs of wheel-supporting sections may be employed, if desired, and the ramp section and intermediate section used in conjunction with the additional wheel-supporting sections to raise other vehicles above the ground while the wheel-supporting sections B and C are in use.

When the vehicle is to be removed, these sections are again reassembled, as in the first instance, and the vehicle backed off from the vehicle lift and back onto the ground.

The advantages of the invention are manifest. The construction can be fabricated at a nominal expense. By the use of several pairs of wheel supporting sections; the intermediate and ramp sections are almost always available for lifting and loading other vehicles. The parts are quickly assembled and disassembled, and the intermediate section and ramp section can be removed to give greater access to the under structure of the vehicle. The vehicle lift utilizes the power of the vehicle for elevating the same thus eliminating manual labor and the manipulating of jacks and similar structures.

Changes in the specific form of the invention as herein described may be made within the scope of what is claimed without departing from the spirit of the invention.

Having described the invention, what is claimed as new and desired to be protected by Letters Patent is:

1. A vehicle lift comprising front and rear longitudinally spaced wheel-supporting sections on which the front and rear wheels of the vehicle may rest, a ramp section connected to one of said wheel-supporting sections and an intermediate section disposed in alignment with and between said wheel-supporting sections, means on said sections forming a continuous track when the sections are assembled, for guiding the wheels of the vehicle from ground engaging positions to elevated positions resting on said wheel-supporting sections, latching means between said intermediate section and said front and rear wheel supporting sections and when in latching positions holding said sections in alignment and restraining longitudinal relative movement therebetween, said latching means when in unlatching positions freeing said intermediate section for transverse movement relative to said wheel-supporting sections, spaced pivots carried by said intermediate section, toggle arms pivotally connected to said pivots and having relatively movable juxtaposed parts, guide means on said parts causing said arms to move in unison, and guide wheels having longitudinally extending axes rotatably mounted on said arms and guiding said intermediate section for transverse movement relative to said wheel-supporting sections for clearing the space therebetween to give access to the underside of the vehicle.

2. A vehicle lift comprising front and rear longitudinally spaced wheel-supporting sections on which the front and rear wheels of the vehicle may rest, a ramp section connected to one of said wheel-supporting sections and an intermediate section disposed in alignment with and between said wheel-supporting sections, means on said sections forming a continuous track when the sections are assembled, for guiding the wheels of the vehicle from ground engaging positions to elevated positions resting on said wheel-supporting sections, latching means between said intermediate section and said front and rear wheel-supporting sections and when in latching positions holding said sections in alignment and restraining longitudinal relative movement therebetween, said latching means when in unlatching postions freeing said intermediate section for transverse movement relative to said wheel-supporting sections transversely spaced pivots carried by said intermediate section, transversely extending toggle arms pivotally connected to said pivots and having relatively movable juxtaposed parts, guide means on said parts causing said arms to move in unison, and guide wheels having longitudinally extending axes rotatably mounted on said arm and guiding said intermediate section for transverse movement relative to said wheel-supporting sections for clearing the space therebetween to give access to the under-structure of the vehicle.

3. A vehicle lift comprising front and rear longitudinally spaced wheel-supporting sections on which the front and rear wheels of the vehicle may rest, a ramp section connected to one of said wheel-supporting sections and an intermediate section disposed in alignment with and between said wheel-supporting sections, means on said sections forming a continuous track when the sections are assembled, for guiding the wheels of the vehicle from ground engaging positions to elevated positions resting on said wheel-supporting sections, latching means between said intermediate section and said front and rear wheel-supporting sections and when in latching positions holding said sections in alignment and restraining longitudinal relative movement therebetween, said latching means when in unlatching positions freeing said intermediate section for transverse movement relative to said wheel-supporting sections transversely spaced pivots carried by said intermediate section, transversely extending toggle arms pivotally connected to said pivots and having relatively movable juxtaposed parts, guide means on said parts causing said arms to move in unison, and guide wheels having longitudinally extending axes rotatably mounted on said arms and guiding said intermediate section for transverse movement relative to said wheel-supporting sections for clearing the space therebetween to give access to the under-structure of the vehicle, an operating lever extending outwardly from one of said arms and means for locking said lever and the toggle arms in a position in which said wheels engage the ground and support the intermediate section above the ground for transverse movement.

4. In a vehicle lift comprising front and rear longitudinally spaced wheel-supporting sections on which the front and rear wheels of the vehicle may rest, a ramp section connected to one of said wheel-supporting sections and an intermediate section disposed in alignment with and between said wheel-supporting sections, means on said sections forming a continuous track when the sections are assembled for guiding the wheels of the vehicle from ground engaging positions to elevated positions resting on said wheel-supporting sections, latching means between said intermediate section and said front and rear wheel-supporting sections and when in latching positions holding said sections in alignment and restraining longitudinal relative movement therebetween, said latching means when in unlatching positions freeing the intermediate section for transverse movement relative to said wheel-supporting sections, the combination of:
  (a) a frame for said intermediate section having laterally spaced outer portions adapted to rest on a floor,
  (b) an arm extending from one of said portions and toward the other portion,
  (c) another arm extending from the other portion and toward the first portion,
  (d) pivot means for pivoting said arms to said portions of said frame,
  (e) said arms extending toward one another and having juxtaposed parts disposed intermediate said pivot means,
  (f) means acting between said arms at the juxtaposed parts thereof and causing simultaneous swinging movement in up and down directions,
  (g) a ground engaging wheel rotatably mounted on each of said arms intermediate the pivot means therefor and the juxtaposed part of said arm,
  (h) one of said arms having a part extending outwardly beyond the juxtaposed part thereof,
  (i) and actuating means at the end of the denoted part of said arm for moving said arm, said part being adapted upon downward movement to lower said wheels into engagement with the floor and to raise said frame above the floor.

References Cited in the file of this patent
UNITED STATES PATENTS

| | | |
|---|---|---|
| 1,493,475 | Cook | May 13, 1924 |
| 2,171,466 | Yanocsik | Aug. 29, 1939 |
| 2,470,637 | Olson | May 17, 1949 |
| 2,705,081 | Jacobs | Mar. 29, 1955 |
| 2,812,081 | Schrader | Nov. 5, 1957 |
| 2,822,055 | Ludowici | Feb. 4, 1958 |